US011164460B2

(12) United States Patent
Grabbe et al.

(10) Patent No.: US 11,164,460 B2
(45) Date of Patent: Nov. 2, 2021

(54) SYSTEM FOR COLLISION AVOIDANCE AND METHOD FOR COLLISION AVOIDANCE

(71) Applicant: Jungheinrich AG, Hamburg (DE)

(72) Inventors: Florian Grabbe, Hamburg (DE); Stefan Ahrens, Rellingen (DE); Sven-Ole Heise, Osterrönfeld (DE); Jan Kopelke, Hamburg (DE); Tony Altmann, Brokstedt (DE)

(73) Assignee: Jungheinrich AG, Hamburg (DE)

( * ) Notice: Subject to any disclaimer, the term of this patent is extended or adjusted under 35 U.S.C. 154(b) by 325 days.

(21) Appl. No.: 16/292,468

(22) Filed: Mar. 5, 2019

(65) Prior Publication Data

US 2019/0272757 A1    Sep. 5, 2019

(30) Foreign Application Priority Data

Mar. 5, 2018  (DE) ...................... 10 2018 104 987.0

(51) Int. Cl.
*G08G 1/16*  (2006.01)
*G01S 5/02*  (2010.01)
*G01S 11/08*  (2006.01)
*F16P 3/14*  (2006.01)

(52) U.S. Cl.
CPC .............. *G08G 1/164* (2013.01); *F16P 3/147* (2013.01); *G01S 5/0289* (2013.01); *G01S 11/08* (2013.01); *G08G 1/166* (2013.01)

(58) Field of Classification Search
CPC ..................................................... G08G 1/164
See application file for complete search history.

(56) References Cited

U.S. PATENT DOCUMENTS

| 5,433,296 A | * | 7/1995 | Webberley | .............. | B60T 17/22 188/1.11 L |
| 5,835,008 A | * | 11/1998 | Colemere, Jr. | ........ | B60Q 1/441 340/439 |
| 6,067,031 A | * | 5/2000 | Janky | .................... | G01S 13/931 340/903 |
| 9,927,797 B2 | | 3/2018 | Stubbs et al. | | |
| 10,257,646 B2 | | 4/2019 | Buchmann et al. | | |

(Continued)

FOREIGN PATENT DOCUMENTS

| DE | 10324627 A1 | 1/2005 |
| DE | 102005037650 A1 | 2/2007 |

(Continued)

*Primary Examiner* — Jean Paul Cass
(74) *Attorney, Agent, or Firm* — Rankin, Hill & Clark LLP

(57) ABSTRACT

A system and a method for collision avoidance within a monitoring zone includes a first transmitter and receiver apparatus disposed on an industrial truck, a second transmitter and receiver apparatus disposed on a movable object, and at least two stationary positioning apparatuses that are set up for transmitting and receiving electromagnetic signals. A position of the movable object within the monitoring zone is determined. It is determined whether a collision risk exists between the industrial truck and the movable object, and safety measures are initiated if such a collision risk exists. The monitoring zone may include at least one separation zone, wherein no collision risk between the industrial truck and the movable object is determined to exist if the object position is located within the separation zone.

14 Claims, 5 Drawing Sheets

(56) References Cited

U.S. PATENT DOCUMENTS

| | | | |
|---|---|---|---|
| 2003/0125846 A1* | 7/2003 | Yu | G08G 1/0962 701/1 |
| 2003/0149530 A1* | 8/2003 | Stopczynski | B60R 21/013 701/301 |
| 2004/0102889 A1* | 5/2004 | Ibrahim | B60W 30/16 701/96 |
| 2005/0022273 A1* | 1/2005 | Maeki | G05D 1/028 701/300 |
| 2007/0005609 A1* | 1/2007 | Breed | B60N 2/2863 |
| 2007/0021915 A1* | 1/2007 | Breed | G08G 1/164 701/301 |
| 2007/0152804 A1* | 7/2007 | Breed | B60W 30/16 340/435 |
| 2007/0222638 A1* | 9/2007 | Chen | G08G 1/095 340/901 |
| 2008/0040023 A1* | 2/2008 | Breed | G01S 19/50 701/117 |
| 2008/0154629 A1* | 6/2008 | Breed | B60N 2/2863 705/1.1 |
| 2008/0319829 A1* | 12/2008 | Hunt | G06Q 30/0201 705/7.29 |
| 2010/0214126 A1* | 8/2010 | Publicover | G08G 1/0962 340/907 |
| 2010/0225762 A1* | 9/2010 | Augst | B60R 1/12 348/148 |
| 2011/0279261 A1 | 11/2011 | Gauger et al. | |
| 2011/0298603 A1* | 12/2011 | King | G08G 1/042 340/436 |
| 2011/0304465 A1* | 12/2011 | Boult | B60K 28/06 340/576 |
| 2012/0303222 A1* | 11/2012 | Cooprider | B60W 30/18109 701/48 |
| 2013/0110315 A1* | 5/2013 | Ogawa | G08G 1/096716 701/1 |
| 2014/0009275 A1* | 1/2014 | Bowers | G06Q 40/08 340/436 |
| 2014/0309804 A1* | 10/2014 | Ricci | B60W 50/10 701/1 |
| 2016/0062345 A1 | 3/2016 | Stubbs et al. | |
| 2017/0197617 A1* | 7/2017 | Penilla | G08G 1/0112 |
| 2017/0318470 A1* | 11/2017 | Srikanteswara | H04W 16/14 |
| 2017/0374511 A1 | 12/2017 | Buchmann et al. | |
| 2018/0181104 A1 | 6/2018 | Stubbs et al. | |
| 2019/0392712 A1* | 12/2019 | Ran | G08G 1/096725 |

FOREIGN PATENT DOCUMENTS

| | | |
|---|---|---|
| DE | 102006038856 A1 | 2/2008 |
| DE | 102008017129 A1 | 10/2009 |
| DE | 102011078615 A1 | 1/2013 |
| DE | 102016006119 A1 | 11/2017 |
| WO | 2016033233 A1 | 3/2016 |
| WO | 2017223425 A1 | 12/2017 |

* cited by examiner

SYSTEM FOR COLLISION AVOIDANCE AND METHOD FOR COLLISION AVOIDANCE

PRIORITY CLAIM

This application claims priority to DE 10 2018 104 987.0, filed Mar. 5, 2018, which is hereby incorporated by reference in its entirety.

BACKGROUND OF INVENTION

Field of Invention

The invention relates to a system for collision avoidance within a monitoring zone of a goods logistics facility and a method for collision avoidance within a monitoring zone of a goods logistics facility.

Brief Description of Related Art

Where industrial trucks such as are used throughout goods logistics facilities are operated, it is useful to minimize the risk of accidents and collisions. Such goods logistics facilities such as warehouses or industrial buildings, often have tight spaces with unclear conditions.

Against this background, the use of systems for collision avoidance is useful, which notify other persons and industrial trucks of the presence of an approaching industrial truck. For this purpose, industrial trucks are often equipped with light signals or acoustic signals. Acoustic signals are, however, not heard due to ambient noise. Optical signals, on the other hand, are easily visible only if visual contact with the industrial truck is established, and they can be overlooked due to other light signals.

Moreover, the sounds of a warning siren or the light signals of a warning light are perceived even if there is no risk of a collision at all. This is the case, for example, when the industrial truck is moving away from a person. This causes the danger that the warning signals may be ignored when there is an acute risk of collision where non-relevant warnings occur too frequently. Moreover, productivity throughout the goods logistics facility is thereby unnecessarily reduced.

The problem addressed by the invention consists in providing a system and a method for collision avoidance within a monitoring zone of a goods logistics facility that achieve a high level of safety without hindering operations throughout the goods logistics facility unduly at the same time.

This problem is solved by a system for collision avoidance as disclosed and claimed herein.

BRIEF SUMMARY OF THE INVENTION

A system for collision avoidance within a monitoring zone of a goods logistics facility is provided, and includes a first transmitter and receiver apparatus, a second transmitter and receiver apparatus, and at least two stationary positioning apparatuses, wherein the positioning apparatuses are set up for transmitting and receiving electromagnetic signals, and the positions of the positioning apparatuses with respect to the monitoring zone can be specified or determined, wherein the first transmitter and receiver apparatus is disposed on an industrial truck and the second transmitter and receiver apparatus is disposed on a movable object, wherein the system is set up for determining an object position of the movable object within the monitoring zone by means of a propagation delay measurement of a signal between the second transmitter and receiver apparatus and the positioning apparatuses, wherein the system is further set up for determining whether a collision risk exists between an industrial truck and a movable object and for initiating safety measures if a collision risk exists, wherein the system is further developed by the monitoring zone including at least one separation zone, wherein the system is set up for defining that there is no collision risk between an industrial truck and a movable object if the object position is located within the separation zone.

The system according to the invention for collision avoidance within a monitoring zone of a goods logistics facility makes it possible to determine the object position of the movable object within the monitoring zone using propagation delay measurements between the second transmitter and receiver apparatus affixed to the movable object and the stationary positioning apparatuses. At the same time, the system is set up for detecting a collision risk between an industrial truck and a movable object. In a first embodiment, this can for example take place using a propagation delay measurement between the first transmitter and receiver apparatus on the industrial truck and the second transmitter and receiver apparatus on the movable object. By means of this propagation delay measurement, the distance between the industrial truck and the movable object is determined, and safety measures are initiated if the distance falls short of a specifiable minimum distance. The invention, however, also includes other possibilities for determining a collision risk between an industrial truck and a movable object, which will be described at a later time.

The stationary positioning apparatuses are frequently also referred to as anchor nodes.

A position determination of the movable object within a level, defined monitoring zone of a goods logistics facility is possible with as few as two positioning apparatuses, provided that additional information is available. This results from the fact that, in the level monitoring zone with known distances between the movable object and the positioning apparatuses, distance circles can be defined surrounding the positioning apparatuses. With two positioning apparatuses, the position of the movable object then corresponds with one of the two intersections of the distance circles. If, for example, both positioning apparatuses are disposed on an outer boundary of the monitoring zone, one of the two intersections is always outside the monitoring zone. This information is available to the system as additional information, so that it considers only the intersection located within the monitoring zone and can determine the position of the movable object unambiguously.

Advantageously, however, at least three positioning apparatuses are used, as these enable a precise positioning of the movable object in a single-level monitoring zone in any given location. With a more complex monitoring zone, which, for example, comprises several floors of a building or several rows of warehouse racks, it is advantageous to increase the number of positioning apparatuses accordingly.

A movable object within the scope of this application is for example a person or an industrial truck. A goods logistics facility is, for example, a warehouse, an industrial building, a workshop building, or a contiguous complex of such buildings. A monitoring zone is a zone within a goods logistics facility within which, by means of a propagation delay measurement between the positioning apparatuses and a transmitter and receiver apparatus, the position of an object equipped with such transmitter and receiver apparatus can be determined. The monitoring zone can also be restricted to a smaller zone, for example part of a building.

Advantageously, a separation zone according to the invention prevents safety measures from being initiated without the presence of a collision risk. This is, for example, the case when a person is located close to the industrial truck but is separated therefrom by an impassable obstacle, e.g. a safety fence. In this manner, it is avoided that productivity throughout the goods logistics facility is reduced due to unnecessary safety measures being initiated.

Preferably, it is checked whether the object position is located within the separation zone by defining a specifiable part of the monitoring zone as a separation zone by means of the positioning apparatuses, and by comparing the object position to such specifiable part of the monitoring zone, wherein in particular the shape and/or the dimensions and/or the location of the separation zone can be specified.

The separation zone can advantageously be specified as a virtual zone. Such a virtual zone includes a specifiable part of the monitoring zone, which is defined in relation to a coordinate system that is specified by the positioning apparatuses. By locating the object position, it is possible to verify whether the movable object is located within the separation zone. Advantageously, this makes an exact definition of the separation zone possible, which neither includes zones outside a safe zone nor excludes parts within the safe zone. Such a separation zone precisely follows the path of a safety fence, for example.

In a preferred embodiment, the system is set up for determining an industrial truck position of the industrial truck within the monitoring zone using propagation delay measurement of a signal between the first transmitter and receiver apparatus and the positioning apparatuses and for taking into account the industrial truck position and the object position when determining the collision risk between an industrial truck and a movable object.

In accordance with this embodiment, therefore not only the object position but also the industrial truck position is determined using propagation delay measurements. This makes it possible to take into account the object position and the industrial truck position for determining the collision risk. A propagation delay measurement between the first transmitter and receiver apparatus and the second transmitter and receiver apparatus is not necessary in this case for determining a collision risk. In this embodiment, it is, for example, advantageously possible to take into account for determining the collision risk that the industrial truck and the movable object are separated by an obstacle, the position of which is known.

In accordance with an alternative embodiment, although the industrial truck position is determined by means of propagation delay measurement, the collision risk is determined further or additionally by means of a propagation delay measurement between the first transmitter and receiver apparatus and the second transmitter and receiver apparatus.

Also preferably, the existence and/or the shape and/or the dimensions and/or the location of the separation zone is/are time dependent or variable over time, wherein a dependence of the separation zone exists in particular on the industrial truck position and/or the object position and/or the position of a stationary object.

It is in particular provided that certain separation zones be defined as variable separation zones and other separation zones be defined as invariable separation zones. For example, safety zones that are impassable for industrial trucks can be considered as invariable separation zones. Zones that industrial trucks can still travel in even though they are separated from other zones by means of obstacles such as walls or racks can be considered as variable separation zones. Accordingly, such zones can be defined as separation zones so long as there is no industrial truck present within this separation zone in order to thus prevent a risk of collision between a person within this separation zone and an industrial truck beyond the obstacle from being triggered. If, on the other hand, an industrial truck enters the separation zone, this separation zone is canceled or made smaller.

In accordance with one embodiment, the system is set up for defining a vehicle contour extension zone for the industrial truck and an object contour extension zone for the movable object, wherein the industrial truck position is located within the vehicle contour extension zone and the object position is located within the object contour extension zone, wherein a risk of a collision between the industrial truck and the movable object is determined to be present if the vehicle contour extension zone and the object contour extension zone overlap and if the object position is located outside the separation zone.

Such a contour extension zone can consist of a circle, for example, the center of which is located on the industrial truck position or the object position. The invention also includes other shapes of contour extension zones, though. Advantageously, the collision risk can be determined more precisely by taking into account contour extension zones.

Preferably, the system is set up for determining the speed and movement direction of the industrial truck and the movable object, in particular by means of a odometer and/or an inertial measuring unit and/or by means of position determination using propagation delay measurement of a signal between the first transmitter and receiver apparatus and the positioning apparatuses and between the second transmitter and receiver apparatus and the positioning apparatuses.

For the position determination by means of propagation delay measurement, the speed and movement direction are determined by means of repeated position determination, so that in particular a distance traveled by the industrial truck or the movable object within the monitoring zone can be determined as a function of time.

Also preferably, the sizes of the vehicle contour extension zone and the object contour extension zone are dependent upon the speed of the industrial truck or respectively the movable object, wherein the contour extension zones change, in particular increase in size, at a higher speed, wherein the contour extension zones are extended further in the direction of the movement direction in comparison to other directions.

Due to the shape of the contour extension zones being dependent upon the speed and movement direction of the industrial truck and of the movable object, the presence of a collision risk can be determined more precisely. By enlarging the contour extension zone in the direction of the movement direction, an overlap of the contour extension zones is produced, even when there is a greater distance between the industrial truck and the movable object if the industrial truck moves toward the movable object, if the movable object moves toward the industrial truck, or if both are moving towards one another, so that in this case a collision risk is established earlier at a greater distance. In the direction opposing the movement direction, the contour extension zones are preferably made smaller. In this manner, the initiation of safety measures is avoided if, for example, the industrial truck is moving away from the moving object. The contour extension zones can be elliptical, for example. However, other shapes of the contour extension zones are also included in the invention.

The signal transmission between the first transmitter and receiver apparatus and the positioning apparatuses and/or the second transmitter and receiver apparatus and the positioning apparatuses preferably takes place by means of ultra-wideband technology.

Preferably, the safety measures include an intervention in control functions of the industrial truck and/or the outputting of a warning. Particularly, such a warning is displayed on a display of the industrial truck as an optical signal and/or is output as an acoustic signal at the industrial truck. Moreover or alternatively, an optical and/or acoustic signal is output on a warning apparatus connected with the second transmitter and receiver apparatus. The intervention in the control function of the industrial truck includes in particular the braking of the industrial truck. If the movable object is another industrial truck, an intervention in the control function of such industrial truck is preferably also provided.

The problem is also solved by a method for collision avoidance within a monitoring zone of a goods logistics facility, wherein at least two positioning apparatuses, which are set up for transmitting or receiving electromagnetic signals, are disposed in stationary positions that can be specified or determined, wherein a first transmitter and receiver apparatus is affixed to an industrial truck and a second transmitter and receiver apparatus is affixed to a movable object, wherein an object position of the movable object within the monitoring zone is determined by means of propagation delay measurement of a signal between the second transmitter and receiver apparatus and the positioning apparatuses, wherein it is determined whether a collision risk exists between an industrial truck and a movable object and safety measures are initiated if a collision risk exists, wherein the method is further developed by the monitoring zone including at least one separation zone, wherein it is defined that there is no collision risk between an industrial truck and a movable object if the object position is located within the separation zone.

Additionally, at least one control apparatus, in particular a computer, is preferably provided that is disposed on the industrial truck and/or on the movable object and/or at least on one of the positioning apparatuses. Alternatively or additionally, at least one control apparatus is disposed separately from the industrial truck, the movable object, and the positioning apparatuses. The control apparatus is equipped for determining the risk of collision between an industrial truck and a movable object, defining separation zones, and for determining the object position and in particular also the industrial truck position.

Preferably, it is checked whether the object position is located within the separation zone by defining a specifiable part of the monitoring zone as a separation zone by means of the positioning apparatuses, and by comparing the object position to such specifiable part of the monitoring zone, wherein in particular the shape and/or the dimensions and/or the location of the separation zone can be specified.

Also preferably, an industrial truck position of the industrial truck is determined within the monitoring zone using propagation delay measurement of a signal between the first transmitter and receiver apparatus and the positioning apparatuses, and the industrial truck position and the object position are taken into account when determining a collision risk between an industrial truck and a movable object.

Moreover, it is preferable if the existence and/or the shape and/or the dimensions and/or the location of the separation zone is/are time dependent or variable over time, wherein a dependence of the separation zone exists in particular on the industrial truck position and/or the object position and/or the position of a stationary object.

In a preferred embodiment, a vehicle contour extension zone is defined for the industrial truck and an object contour extension zone is defined for the movable object, wherein the industrial truck position is located within the vehicle contour extension zone and the object position is located within the object contour extension zone, wherein a risk of a collision between the industrial truck and the movable object is determined to be present if the vehicle contour extension zone and the object contour extension zone overlap and if the object position is located outside the separation zone.

Preferably, the speed and movement direction of the industrial truck and the movable object are determined, in particular by means of a hodometer and/or an inertial measuring unit and/or by means of position determination using propagation delay measurement of a signal between the first transmitter and receiver apparatus and the positioning apparatuses and between the second transmitter and receiver apparatus and the positioning apparatuses.

Also preferably, the sizes of the vehicle contour extension zone and the object contour extension zone are dependent upon the speed of the industrial truck or respectively the movable object, wherein the contour extension zones change, in particular increase in size, at a higher speed, wherein the contour extension zones are extended further in the direction of the movement direction in comparison to other directions.

The signal transmission between the first transmitter and receiver apparatus and the positioning apparatuses and/or the second transmitter and receiver apparatus and the positioning apparatuses preferably takes place by means of ultra-wideband technology.

Also preferably, the safety measures include an intervention in the control function of the industrial truck and/or the output of a warning.

The method for collision avoidance embodies the same advantages, features, and characteristics as the system for collision avoidance described above.

Further features of the invention will become apparent from the description of the embodiments according to the invention together with the claims and the attached drawings. Embodiments according to the invention can fulfill individual features or a combination of several features.

BRIEF DESCRIPTION OF THE DRAWINGS

The invention is described below, without restricting the general idea of the invention, using exemplary embodiments with reference to the drawings, wherein express reference is made to the drawings with regard to all details according to the invention that are not explained in greater detail in the text. In the figures.

In the drawings, in each case the same or similar elements and/or parts are provided with the same reference numbers, so that in each case a repeated introduction is omitted.

DETAILED DESCRIPTION OF THE INVENTION

Figure 1:
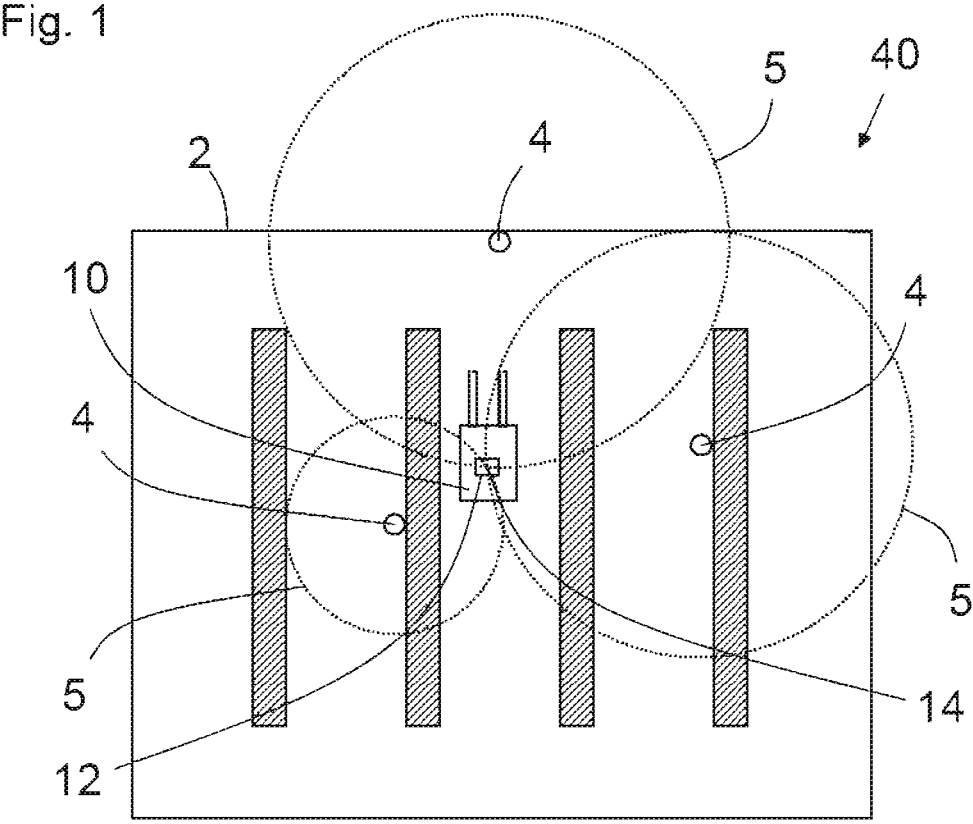
FIG. 1 shows a schematic representation of a position determination within a monitoring zone using propagation delay measurement.

FIG. 1 schematically shows a warehouse 40 as an example of a goods logistics facility within which an industrial truck 10 is present. Such a warehouse 40 is, as shown in FIG. 1, often a confined space with unclear conditions due to obstacles such as racks or walls. In the warehouse 40, three stationary positioning apparatuses 4 are disposed. The positioning apparatuses 4 are each equipped with means for transmitting and receiving electromagnetic signals, in particular signals such as are used in ultra-wideband technologies. The invention also includes embodiments with fewer, and in particular with more, than three positioning apparatuses 4. The positioning apparatuses 4 also need not be disposed inside the warehouse 40 or the monitoring zone 2, respectively, but may instead also be located outside of them. The monitoring zone 2 corresponds with the warehouse 40 in the example shown in FIG. 1, but it could also be restricted to merely a part of this warehouse 40.

The industrial truck 10 is equipped with a first transmitter and receiver apparatus 12, which is also set up for transmitting and receiving such signals. In order to determine the distance of the first transmitter and receiver apparatus 12 and a positioning apparatus 4, a propagation delay measurement as known from the prior art is performed. This makes it possible to define a distance circle 5 for each positioning apparatus 4 in which the first transmitter and receiver apparatus 12 and thus the industrial truck 10 is present. With a three-dimensional monitoring zone 2 there are distance spheres instead. In order to locate the industrial truck position 14, it is firstly necessary to know the positions at which the positioning apparatuses 4 are located and, secondly, the intersection must be determined at which all distance circles 5 intersect. The industrial truck position 14 is then located precisely on this intersection. The position of a movable object 20, which is not shown in FIG. 1, is located in an equivalent manner.

Figure 2:
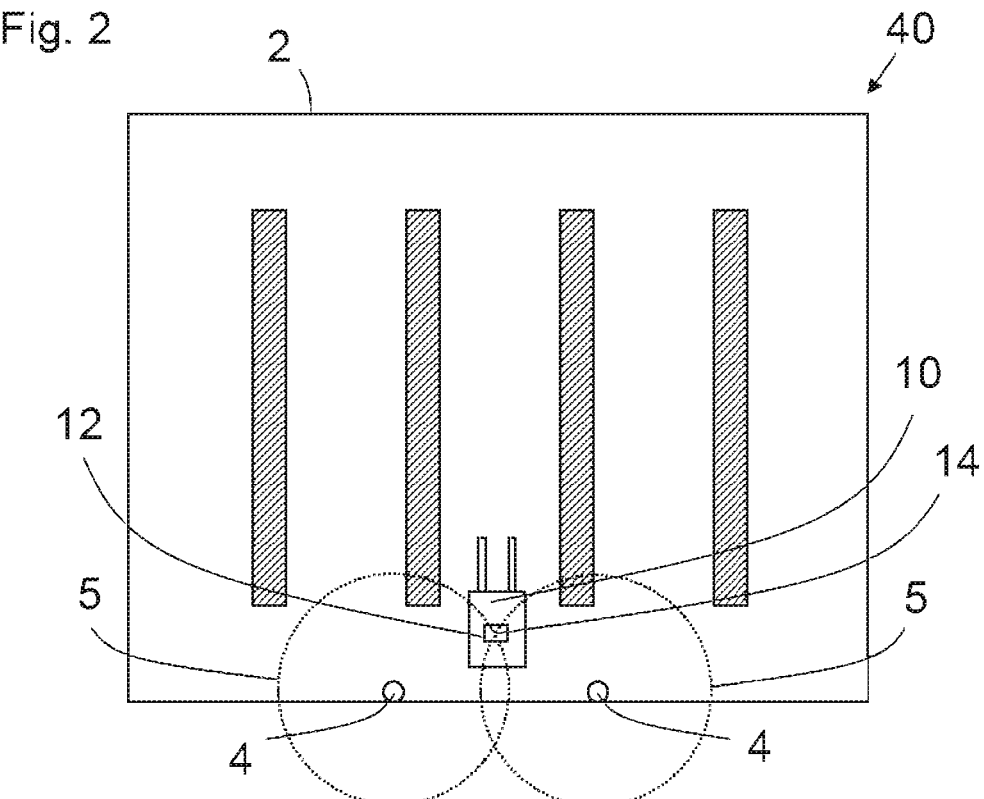
FIG. 2 shows a schematic representation of a position determination within a monitoring zone using propagation delay measurement with two positioning apparatuses.

FIG. 2 schematically shows how the position of the industrial truck 10 or of a movable object can be determined using only two positioning apparatuses 4. For this purpose, the monitoring zone 2 is defined such that it is identical to the area of the warehouse 40 or is located completely within the warehouse 40. The two positioning apparatuses 4 are then arranged for example on the same wall of the warehouse 40. The two intersections of the distance circles 5 result as two possible positions for determining the industrial truck position 14. Due to the arrangement of the positioning apparatus 4 on a boundary of the monitoring zone 2, however, one intersection is always located outside the monitoring zone 2 or the warehouse 40, respectively.

In order to determine the industrial truck position 14, the intersection outside the warehouse 40 is ignored for the position determination so that the position of the industrial truck 10 can be determined unambiguously. Optimally for this purpose, the zone behind this wall of the warehouse 40 should be inaccessible to industrial trucks, so that a faulty position determination is avoided.

Figure 3:
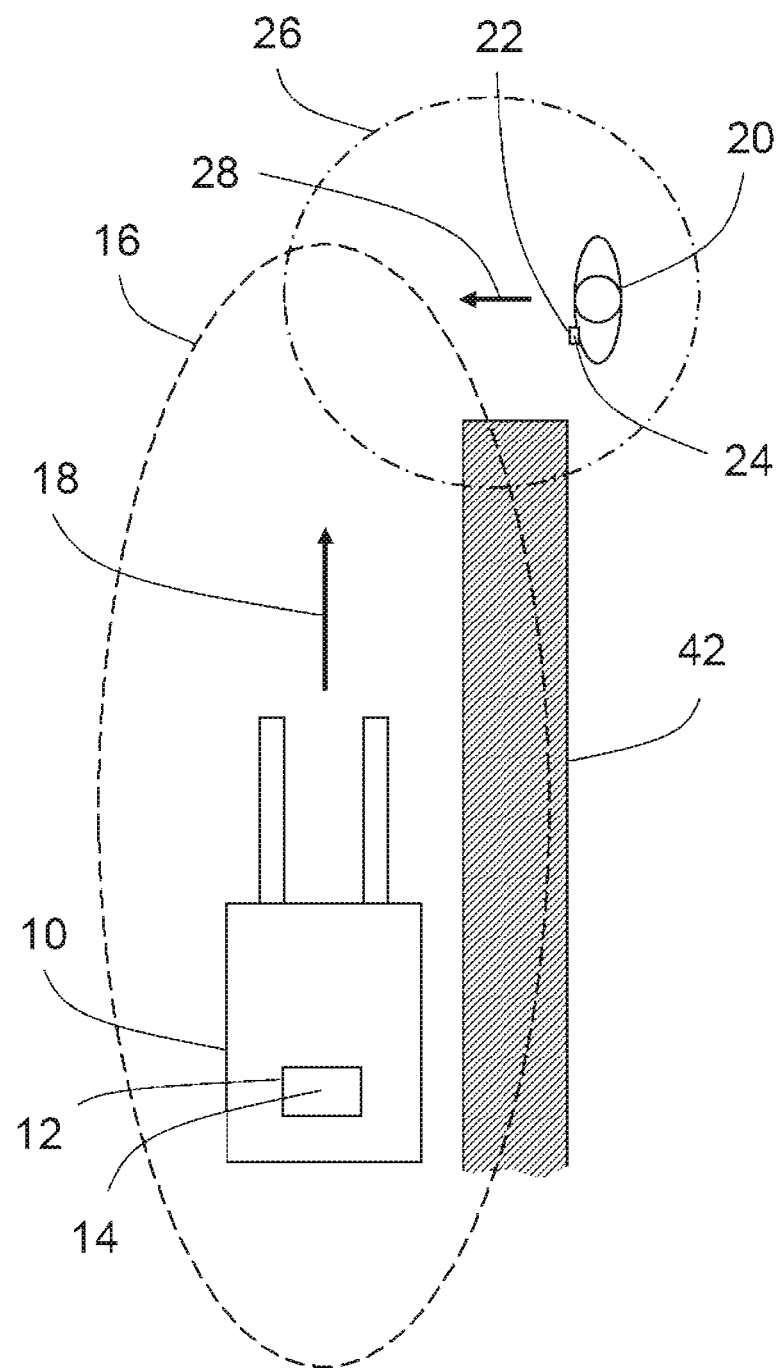
FIG. 3 shows a schematic representation of a method for determining a collision risk using contour extension zones.

FIG. 3 schematically shows a method for avoiding a collision using contour extension zones 16, 26. For this purpose, first the industrial truck position 14 of the industrial truck 10 and the object position 24 of the movable object 20, in this case a person, are determined. Additionally, the movement direction and the speed of the industrial truck 10 and of the movable object 20 are determined. This is done for example using a hodometer and/or an inertial measuring unit (IMU) and/or several position determinations that chronologically follow one another. This results in a first movement vector 18 for the industrial truck 10 and a second movement vector 28 for the movable object 20.

Additionally, a vehicle contour extension zone 16 is placed around the industrial truck 10 and an object contour extension zone 26 is placed around the movable object 20. If the industrial truck 10 and the movable object 20 are not in motion, these contour extension zones 16, 26 are for example circles that are placed around the industrial truck position 14 or the object position 24, respectively, as their center. When the industrial truck 10 or respectively the movable object 20 is moving, the corresponding contour extension zones 16, 26 change, wherein the contour extension zones 16, 26 are enlarged in particular in the direction of the movement vectors 18, 28 as shown in FIG. 3.

If the contour extension zones 16, 26 overlap, a collision risk between the industrial truck 10 and the movable object 20 is established. In the constellation shown in FIG. 3, a collision risk between the industrial truck 10 and the person is detected in this manner, although direct visual contact is blocked by a rack 42. In this case, the speed of the industrial truck 10 is, for example, automatically reduced, and/or an optical and/or acoustic warning is output on the industrial truck 10 and/or on the movable object.

The first transmitter and receiver apparatus 12 is preferably arranged on the industrial truck 10, so that an interference-free communication with the positioning apparatuses 4 is possible. The second transmitter and receiver apparatus 22 can, for example, be arranged on the clothing of a person as shown in FIG. 3, or it may be affixed to a helmet or in the shoes, or, if the movable object 20 is an industrial truck, it may be arranged similarly to the first transmitter and receiver apparatus 12.

The industrial truck 10 and the person 20 are shown enlarged in this representation in comparison to the contour extension zones 16, 26 for better visibility. The sizes of the contour extension zones are preferably selected so that a timely braking of the industrial truck 10 is still possible to avoid a collision, even at high movement speeds.

Figure 4:
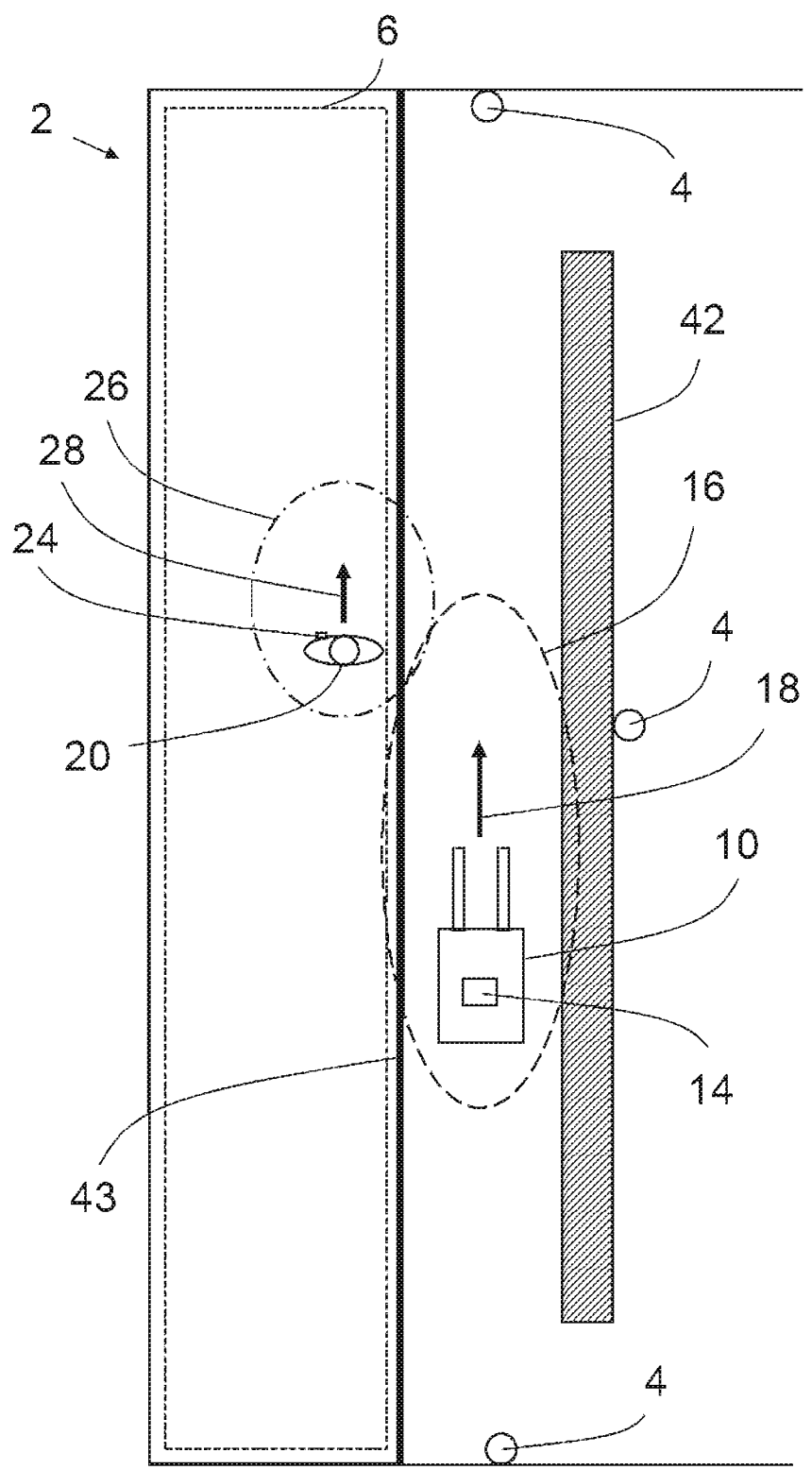
FIG. 4 shows a schematic representation of a monitoring zone with a separation zone, an industrial truck, and a person.

With such a system for collision avoidance or such a method for collision avoidance, it is, however, also possible that safety measures are initiated when there is no risk of collision at all. Such a case is shown in FIG. 4. Here, the industrial truck 10 is moving within the monitoring zone 2 near the movable object 20, in this case a person, so that the contour extension zones 16, 26 overlap. However, since the industrial truck 10 and the person 20 are separated by a barrier 43, for example a safety fence, there is no risk of a collision. If the industrial truck 10 were nevertheless to be braked or other safety measures were to be taken, this would result in an unnecessary disruption of operations throughout the goods logistics facility and/or an unnecessary nuisance for the person 20 and/or the operator of the industrial truck 10.

For this reason, the zone behind the barrier 43, which is located to the left of the barrier 43 in the representation in FIG. 4, is set up as a separation zone 6. The separation zone 6 is in this case a personal safety zone 6 that is inaccessible to the industrial trucks 10. As long as the object position 24 of the person 20 is located within the separation zone 6, the overlapping of the contour extension zones 16, 26 is ignored, and no safety measures are initiated. As long as the object position 24 is known, such separation zones 6 can also be used for other types of determining a collision risk, for example direct distance measurement between an industrial truck 10 and a movable object 20.

The shape and/or dimensions and/or location of the separation zone 6 can be specified and includes a zone within the monitoring zone 2. It is determined whether the movable object 20 is located within the separation zone 6 by determining the object position 24 by means of propagation delay measurement using the positioning apparatuses 4, and the object position 24 is subsequently compared with the zone defined for the separation zone 6.

Figure 5:
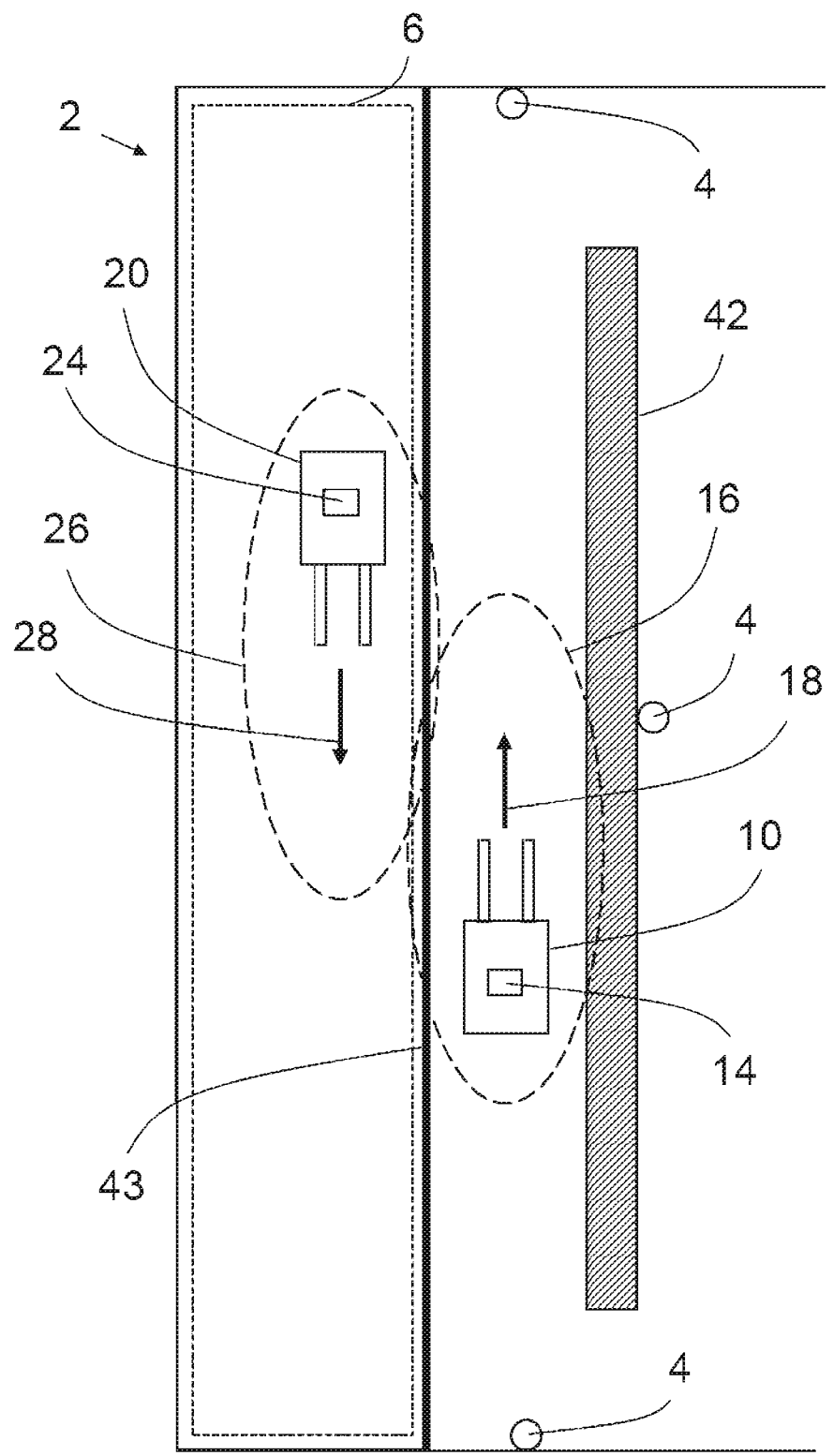
FIG. 5 shows a schematic representation of a monitoring zone with a separation zone and two industrial trucks.

In the example shown in FIG. 5, the movable object 20 is not a person but another industrial truck. In this case, the barrier 43 defines for example a two-lane track. In order for the oncoming industrial trucks 10, 20 not to slow down, at least one track or one lane is defined as a separation zone 6.

With such an application of the separation zone 6, it is particularly advantageous if it is determined whether the movable object 20 is an industrial truck or a person. Additionally, it is advantageous to take into account where this person is located. For example, a person located in the separation zone 6 can be ignored regarding the collision avoidance between the person and an industrial truck 10 in the example shown in FIG. 5, however not regarding the collision avoidance between the person and industrial truck 20. In this case, the separation zone 6 is thus a conditional separation zone or one that is variable over time.

Figure 6:
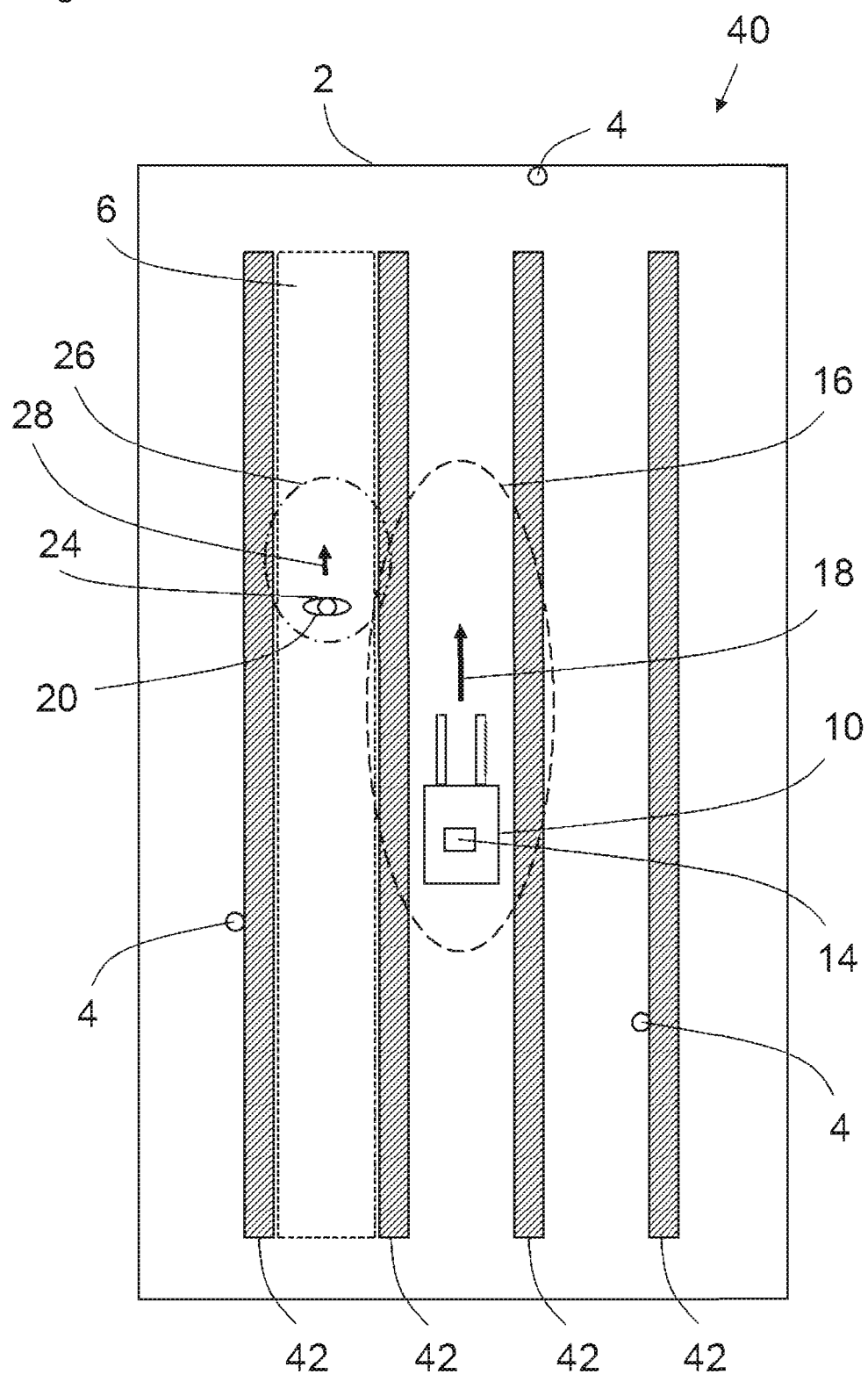
FIG. 6 shows a schematic representation of a monitoring zone with a separation zone that is variable over time.

FIG. 6 shows an example of a variable separation zone 6. Within the warehouse 40, a series of impassable obstacles, for example racks 42, are arranged between which corridors run. Advantageously, a collision warning should only be output if an industrial truck 10 and a movable object 20 are located in the same corridor. If, however, an industrial truck 10 and a movable object 20 are located in different corridors as shown in FIG. 6, no collision risk shall be determined.

For this purpose, the corridor in which the movable object 20 is located is defined as a separation zone 6. For determining the collision risk, the movable object 20 is ignored when the industrial truck 10 passes in the adjacent corridor. The moment in which the industrial truck 10 or another industrial truck enters the corridor in which the movable object 20 is present, however, the separation zone 6 is canceled or made smaller. Alternatively, it is possible in this case, too, to define a conditional separation zone 6, which applies only to collision avoidance between a movable object 20 and an industrial truck 10 that is located in a different corridor as the movable object 20, but not to collision avoidance between a movable object 20 and an industrial truck that is located in the same corridor as the movable object 20.

Personal safety zones that are not accessible to industrial trucks 10 are defined as invariable separation zones 6.

All named features, including those taken from the drawings alone as well as individual features that are disclosed in combination with other features, are considered, alone and in combination, to be essential for the invention. Embodiments according to the invention can be fulfilled by individual features or a combination of several features. In the scope of the invention, characteristics which are designated with "in particular" or "preferably" are understood to be optional features.

REFERENCE SIGNS LIST

2 Monitoring zone
4 Positioning apparatus
5 Distance circle
6 Separation zone
10 Industrial truck
12 First transmitter and receiver apparatus
14 Industrial truck position
16 Vehicle contour extension zone
18 First movement vector
20 Movable object
22 Second transmitter and receiver apparatus
24 Object position
26 Object contour extension zone
28 Second movement vector
40 Warehouse
42 Rack
43 Barrier

What is claimed is:

1. A system for collision avoidance within a monitoring zone of a goods logistics facility, comprising:
    a first transmitter and receiver apparatus,
    a second transmitter and receiver apparatus, and
    at least two stationary positioning apparatuses,
    wherein the at least two stationary positioning apparatuses are set up for transmitting and receiving electromagnetic signals,
    wherein the at least two stationary positioning apparatuses are arranged at predetermined positions with respect to the monitoring zone,
    wherein the first transmitter and receiver apparatus is disposed on an industrial truck controllable by a human operator and the second transmitter and receiver apparatus is disposed on a movable object,
    wherein the system determines an object position of the movable object within the monitoring zone by means of propagation delay measurement of a signal between the second transmitter and receiver apparatus and the at least two stationary positioning apparatuses,
    wherein the system determines whether a risk of collision exists between the industrial truck and the movable object and initiates safety measures if a collision risk does exist,
    wherein the monitoring zone includes at least one separation zone,
    wherein the system determines that there is no collision risk between the industrial truck and the movable object if the object position is located within the separation zone,
    wherein the system determines an industrial truck position of the industrial truck within the monitoring zone using propagation delay measurement of a signal between the first transmitter and receiver apparatus and the at least two stationary positioning apparatuses,
    wherein the system determines the collision risk between an industrial truck and a movable object based on the industrial truck position and the object position,
    wherein the existence and/or the shape and/or the dimensions and/or the location of the separation zone is/are time dependent or variable over time, and
    wherein the existence of the separation zone depends on the industrial truck position and/or the object position and/or a position of a stationary object.

2. The system according to claim 1, wherein:
    the system defines part of the monitoring zone as a separation zone, and checks whether the object position is located within the separation zone by means of the at least two stationary positioning apparatuses, and by comparing the object position to the separation zone, and the shape and/or the dimensions and/or the location of the separation zone can be specified.

3. The system according to claim 1, wherein the system defines a vehicle contour extension zone for the industrial truck and an object contour extension zone for the movable object,
   wherein the industrial truck position is located within the vehicle contour extension zone and the object position is located within the object contour extension zone, and
   wherein the risk of a collision between the industrial truck and the movable object is determined to be present if the vehicle contour extension zone and the object contour extension zone overlap and if the object position is located outside the separation zone.

4. The system according to claim 3, wherein the system determines speeds and movement directions of the industrial truck and the movable object using an odometer, and/or an inertial measuring unit, and/or by position determination using a propagation delay measurement of a signal between the first transmitter and receiver apparatus and the at least two stationary positioning apparatuses and between the second transmitter and receiver apparatus and the at least two stationary positioning apparatuses.

5. The system according to claim 4, wherein sizes of the vehicle contour extension zone and the object contour extension zone are respectively dependent upon the speed of the industrial truck and upon the speed of the movable object,
   wherein the size of the vehicle contour extension zone increases in size as the speed of the industrial truck increases such that the vehicle contour extension zone is extended further in a direction of the movement direction of the industrial truck in comparison to other directions, and
   wherein the size of the object contour extension zone increases in size as the speed of the moveable object increases such that the object contour extension zone is extended further in a direction of the movement direction of the moveable object in comparison to other directions.

6. The system according to claim 5, wherein the signal transmission between the first transmitter and receiver apparatus and the at least two stationary positioning apparatuses, and/or between the second transmitter and receiver apparatus and the at least two stationary positioning apparatuses, takes place through an ultra-wideband transmission.

7. The system according to claim 6, wherein the safety measures include an intervention in control functions of the industrial truck, and/or the output of a warning.

8. A method for collision avoidance within a monitoring zone of a goods logistics facility, wherein at least two positioning apparatuses, which are set up for transmitting or receiving electromagnetic signals, are disposed in stationary positions that can be specified or determined, wherein a first transmitter and receiver apparatus is arranged on an industrial truck controllable by a human operator and a second transmitter and receiver apparatus is arranged on a movable object, the method comprising:
   determining an object position of the movable object within the monitoring zone using a propagation delay measurement of a signal between the second transmitter and receiver apparatus and the at least two positioning apparatuses, and
   determining whether a collision risk exists between an industrial truck and the movable object and initiating safety measures if a collision risk exists;
   wherein the monitoring zone includes at least one separation zone and the method includes determining that there is no collision risk between the industrial truck and the movable object if the object position is located within the separation zone,
   wherein an industrial truck position of the industrial truck within the monitoring zone is determined using a propagation delay measurement of a signal between the first transmitter and receiver apparatus and the at least two positioning apparatuses,
   wherein the collision risk between an industrial truck and a movable object is determined based on the industrial truck position and the object position,
   wherein the existence and/or the shape and/or the dimensions and/or the location of the separation zone is/are time dependent or variable over time, and
   wherein the existence of the separation zone depends on the industrial truck position, and/or the object position, and/or a position of a stationary object.

9. The method according to claim 8, further including checking whether the object position is located within the separation zone by defining a part of the monitoring zone as the separation zone using the at least two positioning apparatuses, and by comparing the object position to the monitoring zone, wherein a shape, and/or dimensions, and/or a location of the separation zone can be specified.

10. The method according to claim 8, further comprising defining a vehicle contour extension zone for the industrial truck and defining an object contour extension zone for the movable object,
    wherein the industrial truck position is located within the vehicle contour extension zone and the object position is located within the object contour extension zone, and
    wherein the risk of a collision between the industrial truck and the movable object is determined to be present if the vehicle contour extension zone and the object contour extension zone overlap and if the object position is located outside the separation zone.

11. The method according to claim 10, further comprising determine the speeds and movement directions of the industrial truck and the movable object using an odometer, and/or an inertial measuring unit, and/or by position determination using a propagation delay measurement of a signal between the first transmitter and receiver apparatus and the at least two positioning apparatuses and between the second transmitter and receiver apparatus and the at least two positioning apparatuses.

12. The method according to claim 11, wherein sizes of the vehicle contour extension zone and the object contour extension zone are respectively dependent upon the speed of the industrial truck and upon the speed of the movable object,
    wherein the size of the vehicle contour extension zone increases in size as the speed of the industrial truck increases such that the vehicle contour extension zone is extended further in a direction of the movement direction of the industrial truck in comparison to other directions, and
    wherein the size of the object contour extension zone increases in size as the speed of the moveable object increases such that the object contour extension zone is extended further in a direction of the movement direction of the moveable object in comparison to other directions.

13. The method according to claim 12, wherein the signal transmission between the first transmitter and receiver apparatus and the at least two positioning apparatuses, and/or between the second transmitter and receiver apparatus and the at least two positioning apparatuses, takes place through an ultra-wideband transmission.

14. The method according to claim 13, wherein the safety measures include an intervention in control functions of the industrial truck, and/or the output of a warning.

* * * * *